United States Patent [19]

Song et al.

[11] Patent Number: 4,808,325
[45] Date of Patent: Feb. 28, 1989

[54] MANNICH DISPERSANT VI-IMPROVER BLENDED WITH PHENOLIC COMPOUND FOR IMPROVED STORAGE STABILITY

[75] Inventors: Yoon S. Song, Lisle; Robert J. Basalay, Naperville, both of Ill.

[73] Assignee: Amoco Corporation, Chicago, Ill.

[21] Appl. No.: 31,355

[22] Filed: Mar. 30, 1987

[51] Int. Cl.$^4$ .................................. C10M 159/16
[52] U.S. Cl. ........................ 252/51.5 A; 252/51.5 R
[58] Field of Search ..................... 252/51.5 A, 51.5 R

[56] References Cited

U.S. PATENT DOCUMENTS

| 3,789,003 | 1/1974 | McCoy | 252/52 A |
|---|---|---|---|
| 3,793,351 | 2/1974 | McCoy | 252/45 |
| 3,872,019 | 3/1975 | Culbertson et al. | 252/51.5 A |
| 4,131,553 | 12/1978 | West | 252/33 |
| 4,142,980 | 3/1979 | Karll et al. | 252/51.5 A |
| 4,170,562 | 10/1979 | West | 252/51.5 A |
| 4,178,259 | 12/1979 | King | 252/42.7 |

FOREIGN PATENT DOCUMENTS 1159368 7/1969 United Kingdom .

Primary Examiner—William R. Dixon, Jr.
Assistant Examiner—Jerry D. Johnson
Attorney, Agent, or Firm—Matthew R. Hooper; William H. Magidson; Ralph C. Medhurst

[57] ABSTRACT

Improved dispersant and VI-improving Mannich composition having reduced susceptibility to viscosity increase during storage, which composition comprises a physical blend prepared by admixing a phenolic compound with a Mannich condensation product obtained from the Mannich reaction of an oxidized polymer, an amine and a formaldehyde-yielding reagent.

27 Claims, No Drawings

MANNICH DISPERSANT VI-IMPROVER BLENDED WITH PHENOLIC COMPOUND FOR IMPROVED STORAGE STABILITY

This invention relates to an oil soluble Mannich condensation product prepared from an oxidized olefin polymer, an amine, and an aldehyde. More particularly, it relates to a Mannich condensation product admixed or blended with a phenolic compound for improved storage stability measured in terms of greater resistance to viscosity increase upon storage in the presence of air.

The operation of diesel and spark ignition internal combustion engines is typically accompanied by lubricant deterioration, which results in the formation of sludge, lacquer, and resinous deposits on interior engine surfaces. These lubricant deterioration products reduce engine efficiency and accelerate engine wear. In order to prevent or reduce the formation of these deposits, a wide variety of chemical additives have been developed for incorporation into lubricating oils. These additives, which are commonly referred to as detergents or dispersants, have the ability to keep deposit-forming materials suspended in the oil so that the engine remains in a clean and efficient operating condition for extended periods of time.

A further characteristic of lubricating oils is their tendency to become thin at elevated temperatures while becoming thick at low temperatures. In the case of a crankcase lubricating oil, it is desirable that the oil not become so thick in a cold engine that starting is difficult. On the other hand, the oil must remain sufficiently viscous in a hot engine so that an oil film is maintained between the moving parts. As a consequence, it is frequently necessary to incorporate additives into lubricating oils which serve to improve the viscosity-temperature relationship. Additives which have the ability to reduce the variation with temperature of the viscosity of a lubricating oil are commonly referred to as viscosity index improvers.

Commonly assigned U.S. Pat. Nos. 3,864,268 (1975) and 3,872,019 of Culbertson, et al.; U.S. Pat. Nos. 4,011,380 (1977), 4,131,553 (1978), and 4,170,562 (1979) of West; and U.S. Pat. No. 4,444,956 (1984) of Schaffhausen, et al. (all of which are incorporated by reference herein) disclose preparation of lubricant additives which exhibit both dispersant and viscosity index improving properties. These additives are obtained from Mannich condensation of an oxidized, high molecular weight, amorphous ethylene-propylene copolymer with a formaldehyde-yielding reactant, and a primary or secondary amine or polyamine.

While these products are excellent commercial lubricant additives, it has been observed that the commercial product, generally comprising about 5 to 15 wt. percent additive and about 85-95% neutral base oil, has a tendency to gradually increase in viscosity upon storage, an effect which we find becomes more pronounced as the total amount of polymer in the product, versus the amount of diluent oil, increases.

Viscosity increase on storage can be particularly troublesome in the case of Mannich dispersant/VI improvers having greater shear stability. One method for improving shear stability in Mannich products obtained from a given molecular weight polymer is to subject the polymer to greater oxidation such that the polymer, prior to the Mannich condensation, is degraded to a lower molecular weight and viscosity, and is thus more shear stable in terms of a Bosch Shear Stability index measurement. While deeper oxidation can enhance the final shear stability of the Mannich product, it has the disadvantage of reducing the thickening power of the polymeric Mannich additive material. Therefore, to compensate for the loss in thickening power it is necessary to use more polymer in the oxidation step in order that the final product has a higher concentration of polymer. Unfortunately, higher polymer levels in the final product can render the product more susceptible to viscosity increase on storage in the presence of oxygen. Although the mechanism for such viscosity increase is not well understood, it is believed, without limitation, that the polymeric Mannich condensation product possibly undergoes cross-linking reactions tending to increase the molecular weight of the polymeric additive, and hence its viscosity.

Based on the foregoing, there is a clear need for improved polymeric Mannich VI-improver/dispersant compositions which are less susceptible to viscosity increase on storage.

West U.S. Pat. No. 4,170,562 discloses that the Mannich condensation reaction of oxidized olefinic polymers with an amine and formaldehyde can be carried out in the presence of 0.01 to 25.0 wt. percent of an oil soluble phenol based on the next polymer to improve the processing and properties of the oxidized oil soluble Mannich reaction product. In particular, West teaches that the inclusion of the phenol as a reactant during the Mannich reaction prevents undesirable resin formation and large increases in viscosity caused by the Mannich reaction. Although West is directed to preventing resin formation and viscosity increase during the Mannich reaction, it is also the case that the presence of a phenolic compound during the Mannich reaction can improve the storage stability of the finished product such that the product has less tendency to undergo viscosity increase upon storage.

Unfortunately, despite the efficacy of using phenol compounds, as taught in West, to control viscosity increases and resin formation during the Mannich reaction, it is presently more desirable to avoid the addition of the phenol compound during the Mannich reaction. The reason for this is that the viscosity increase observed during the Mannich reaction can be a valuable indicator of the completeness of the reaction. We have therefore found it useful to measure the viscosity increase produced during the Mannich reaction as a convenient preliminary quality check in combination with other analytical tools, such as infrared analysis. The tendency of the phenolic compounds to suppress the viscosity increase is thus seen as a disadvantage. Also, when phenol is present as a Mannich reactant it can impair the reliability of infrared analysis to accurately detect the presence of carbonyl in the final product, thus hampering the use of IR for quality control.

It is therefore desired to obtain the benefits of the phenol treatment of West in terms of storage stability in the product while avoiding inclusion of the phenol compound directly in the Mannich reaction as an additional reactant.

A general object of the present invention is thus to improve the storage stability of a Mannich condensation product obtained from the reaction of an oxidized olefin polymer with an amine and an aldehyde. More particularly, an object of the invention is to obtain the storage stability benefits of treating the Mannich condensation product with a phenolic compound without need for the phenolic compound to be present as a reactant during the Mannich reaction. Other objects appear hereinafter.

We have now found that the objects of the present invention can be obtained in an improved dispersant and VI-improving Mannich composition having reduced susceptibility to viscosity increase during storage, which composition comprises a physical blend prepared by admixing a phenolic compound with a Mannich condensation product obtained from the Mannich reaction of an oxidized polymer, an amine, and a formaldehyde yielding reagent.

The present invention, which obviates the prior art requirement of including the phenol compound as one of the Mannich reactants, provides an improved Mannich condensation product having reduced susceptibility to viscosity increase during storage.

In its method aspect, the invention is directed to a method for reducing the tendency of a dispersant VI-improver over Mannich condensation product to increase in viscosity during storage, the method comprising admixing a phenolic compound with a Mannich condensation product obtained from the Mannich reaction of an oxidized olefin polymer, an amine, and a formaldehyde-yielding reactant.

The invention is further directed to a method for producing an improved Mannich dispersant and VI-improving lubricant additive composition having reduced susceptibility to viscosity increase during storage, the method comprising (a) oxidizing an olefinic polymer, (b) condensing the oxidized olefinic polymer with an amine and a formaldehyde-yielding reagent under Mannich reaction conditions and (c) admixing the Mannich condensation product obtained in step (b) with a phenolic compound.

The advantages of the invention include the ability to improve the storage stability of Mannich dispersant/VI-improvers by merely physically blending a phenolic compound with the Mannich product, as contrasted with the prior art method of including the phenol as a reactant during the Mannich condensation. Physical blending is preferred because the viscosity increase observed during the Mannich reaction of the oxidized polymer, amine, and aldehyde, when phenol is not present as an additional Mannich reactant, can be used to monitor the completion of the Mannich reaction. Also, IR analysis of the Mannich product is more reliable if the phenol is absent during the Mannich reaction. Finally, greater product flexibility is afforded in that the improved storage stability can be imparted on an "as needed" basis to previously manufactured Mannich product without need for modifying current Mannich manufacturing practices which may not presently include the addition of phenolic compounds during the Mannich reaction.

Briefly, the Mannich reaction products of the present invention having improved storage stability can be produced by admixing a Mannich condensation product resulting from the Mannich reaction of an oxidized olefinic polymer, an amine, and a formaldehyde-yielding reagent at a temperature of about 250°–400° F. with a phenolic compound at a temperature of about 100°–300° F.

The Mannich condensation reaction can be conducted using a nonreactive solvent such as aromatic or aliphatic hydrocarbons, or lubricant oils. Further details of the Mannich condensation reaction are found in Culbertson, et al., U.S. Pat. No. 3,872,019, which is expressly incorporated by reference herein.

The Mannich reaction can be catalyzed by addition of an alkylbenzene sulfonic acid. The oxidized high molecular weight polymer is aminated in the presence of about 0.01 to 40.0 wt. % (based on the copolymer) of an oil soluble sulfonic acid. To avoid darkening the reaction mixture, the sulfonic acid is added at the same time as the amine or after the amine. This catalyst is disclosed in West U.S. Pat. No. 4,131,553 and is incorporated herein by reference.

The term "olefinic" polymer as used herein and in the claims refers to amorphous addition polymers or copolymers derived from olefinically unsaturated monomers or mixtures thereof. Such olefin monomers include olefins of the general formula R—CH=CH$_2$, in which R is hydrogen, an aliphatic or cycloaliphatic radical of from 1 to about 20 carbon atoms, for example, propene, isobutylene, 1-butene, 1-hexane, 4-methyl-1-pentene, and 1-decene. Other olefinic monomers having a plurality of double bonds can be used, in particular, diolefins containing from about 4 to about 25 carbon atoms, e.g., 1,3-butadiene, 1,4-hexadiene, 1,4-pentadiene, 2-methyl-1,5-hexadiene, 1,7-octadiene, 5-methylene-2-norbornene, norbornadiene, vinyl norbornene, etc.

Suitable ethylene, propylene, copolymers comprise about 20 to about 70, preferably from about 35 to about 45, mole percent propylene and have number average molecular weights of at least 20,000, i.e., from about 20,000 to about 200,000 or more.

A particularly suitable ethylene-propylene copolymer is one having the following characteristics:

| | |
|---|---|
| Number Average Molecular[A] | About 60,000 |
| Weight Percent (Molar) Propylene | 39–43 |
| Monomer Melt Flow | 2.2–3.3[B] |
| Mooney Viscosity | 65–75[C] |

[A]GPC as calibrated against polybutene standards.
[B]ASTM D-1248 10.1 Kg at 230° C.
[C]ASTM D-1646 ML 1 + 4 at 125° C.

Methods of preparation of the copolymers are well known. Such methods are described in many U.S. Patents, i.e., U.S. Pat. Nos. 2,700,633; 2,725,231; 2,792,288; 2,933,480; 3,000,866; 3,063,973; 3,093,621, and others, which are all incorporated by reference.

The polymer can be oxidized by contacting the polymer under suitable conditions of temperature and at atmospheric or elevated pressures with an oxidizing agent such as air or free oxygen or any oxygen containing material capable of releasing oxygen under these conditions. If desired, the oxidation can be conducted in the presence of known oxidation catalysts such as platinum or platinum group metals and compounds containing metals such as copper, iron, cobalt, cadmium, manganese vanadium, etc. The oxidation can be carried out by methods described in U.S. Pat. Nos. 2,982,728; 3,316,177; 3,153,025; 3,865,499; and 3,544,520, which are all incorporated by reference.

Generally, the oxidation can be carried out over a wide temperature range, depending upon the oxidizing agent used; for example, with an active oxidizing agent, e.g., SO$_3$, temperatures in the range of −40° F. to 400° F. can be used, while with less active oxidizing agents, e.g., air, temperatures in the range of 100°–800° F. can be used. The polymers are generally dissolved in oil prior to the oxidation. Further, depending upon the rate desired, the oxidation can be conducted at subatmospheric, atmospheric, or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled by those skilled in the art, so as to obtain the desired optimum results.

The following illustrates a preferred method of oxidizing a polymer. To a copolymer of ethylene and propylene (7 parts), having a number average molecular weight of about 60,000 was added a solvent-extracted SAE 5W mineral oil (93 parts) in an open reaction vessel, and the mixture slowly stirred and heated at a temperature of 370° F., under an inert gas atmosphere, until the solution of the rubber-like polymer in the solvent was affected. Maintaining the 370° F. temperature, the mixture was rapidly agitated in an atmosphere of air diluted 1:1 with nitrogen to promote the oxidation of the copolymer. A 50:50 air/nitrogen ratio was used to preclude the possibility of an explosive mixture being formed. Reaction in the described manner was continued for 2.0–4.0 hours. About 5–50 oxygen atoms per molecule of the copolymer were introduced under such oxidation conditions.

As indicated in U.S. Pat. Nos. 4,011,380 and 4,131,553, sulfonic acid compounds can be advantageously used in the oxidation. Some of the sulfonic acid compounds which can be used have the general formula:

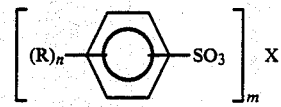

where R is alkyl, aryl, hydroxy, chloro, or bromo substituted alkyl; n is an integer of 1–5, X is a cation, and M is the valence of the cation. In some cases, the R group can be made by polymerizing $C_2$–$C_6$ olefins to a molecular weight in the range of about 80 to about 1,000 and then attaching said groups to a benzene ring by well-known alkylation techniques.

R can be any hydrocarbon or substituted hydrocarbon which results in an oil-soluble benzene sulfonic acid. R can be a low molecular weight alkyl with greater than 0 carbon atoms such as nonyl, decyl, dodecyl, and the like with a molecular weight of at least about 120; an intermediate molecular weight hydrocarbyl such as polybutylene or polypropylene polymers with 15 to 1,000 carbon atoms with a molecular weight of at least 200; a high molecular weight hydrocarbyl such as polyolefin having a number average molecular weight of 100,000; and others. R can be substituted with groups such as chlorine, bromine, or hydroxy groups. Also, the benzene ring of the sulfonic acid may have more than one substituent alkyl or hydroxy or haloalkyl group. X is hydrogen, magnesium, calcium, sodium, amine, etc.

Other suitable oil-soluble benzene sulfonic acids are the oil-soluble petroleum sulfonic acids, commonly referred to as "mahogany acids" of about 350 to 750 molecular weight, aryl sulfonic acids, and alkaryl sulfonic acids. Illustrative of such sulfonic acids are dilauryl benzene sulfonic acid, and lauryl cetyl benzene sulfonic acid. Examples of other suitable sulfonic acids are diparaffin wax-substituted phenol sulfonic acids, cetyl chlorobenzene sulfonic acids, cetyl-phenol disulfide sulfonic acids, cetyl-phenol monosulfide sulfonic acids, cetoxy capryl benzene sulfonic acids. Other suitable oil-soluble sulfonic acids are described in the art, such as for example U.S. Pat. Nos. 2,616,604; 2,626,207; and 2,767,209, and others. A most important consideration in selecting an R group is that the final substituted compound be oil soluble.

The formaldehyde used in the Mannich reaction can be provided by any common formaldehyde yielding reagent. Examples of formaldehyde yielding reagents are formalin, paraformaldehyde, other linear and cyclic formaldehyde polymers, gaseous formaldehyde, and the like.

The amine reactants used in the preparation of the products of the present invention are primary and secondary aliphatic amines containing up to 10 carbon atoms in the aliphatic groups; diamines of the general formula $NH_2(CH_2)_yNH_2$, wherein y is an integer of 2 to about 12; and polyakyene polyamines of the general formula:

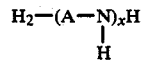

wherein A is a divalent alkylene radical of about 2 to about 12 carbon atoms, and X is an integer from about 1 to about 10. Illustrative of such suitable amines are: methylamine, dibutylamine, cyclohexylamine, propylamine, decylamine, ethylenediamine, trimethylenediamine, tetramethylenediamine, hexamethylenediamine, diethylenetriamine, triethylenetetramine, tetraethylenepentamine, tripropylenetetramine, tetrapropylenepentamine, and other polyalkylene polyamines in which the alkylene group contains up to about 12 carbon atoms. Cyclic polyamines are also suitable such as piperazine and aminoethyl piperazine, etc.

As mentioned earlier, infrared spectroscopy can be used to measure the completeness of the reaction used to produce the Mannich additive. A measurement of the 1680 $cm^{-1}$ adsorption of the Mannich additive which is about 0.20 per 0.5 mm cell path length indicates complete reaction and best additive properties, as determined by engine test values.

In greater detail, the Mannich reaction is preferably carried out with an amine, a formaldehyde-yielding reagent, a copolymer oxidized in the presence or absence of sulfonic acid compound, and, if desired, an oil soluble sulfonic catalyst in an amount of about 0.01 to 40.0 wt. percent sulfonic catalyst based on the neat polymer. A wide variety of such sulfonic acid compounds operate to catalyze the reaction. The functional group of the oil soluble sulfonic acid which provides the important catalytic properties is the sulfonic acid group.

The following illustrates a preferred method of conducting the Mannich condensation reaction with an oxidized polymer and sulfonic acid compound catalyst. One hundred parts of the oxidized copolymer in 1350 parts of SAE 5W mineral oil diluent was heated to 360° F. under a nitrogen blanket. Three parts of solid paraformaldehyde, 4.7 parts of molten hexamethylenediamine and 6.0 parts of an alkyl benzene sulfonic acid having a molecular weight of about 600 in a 39.0% by weight oil solution, were simultaneously added to the stirred reaction mixture at a temperature of 360° F. under a nitrogen blanket. The reaction was continued for 2 hours liberating water until complete. The mixture was stripped with nitrogen at 360° F. to remove water and other volatile byproducts. After filtration, the mixture was clear.

The Mannich reaction is believed to occur between the active acidic protons on carbon atoms, alpha to the carbonyl functions produced during the oxidation. Secondary reactions occur between the active reactants, carbonyl groups, and Mannich nitrogen atoms producing many varied crosslinked and aminated compounds. The active acidic protons react with formaldehyde and the amine. This introduces a detergent dispersant function in the polymer viscosity index improver additive.

The Mannich condensation reaction of the oxidized copolymers can be carried out in the presence of up to about 40 wt. percent, preferably from about 0.10 wt. percent to about 2 wt. percent based on the polymer of an oil soluble sulfonic acid compound. A wide variety of such oil soluble sulfonic acids operate to increase the dispersancy detergent effect of the Mannich sulfonic acid copolymer product and the reaction rate producing the additive.

Preferably the sulfonic acid compound is not added prior to the amine. Sulfonic acid added to the oil-oxidized polymer prior to the amine rapidly decomposes, darkening the oil. The sulfonic acid when added after the amine, reacts with the amine. The acid is neutralized and stabilized preventing decomposition of the acid.

The chemical composition of the final reaction product of the oxidized Mannich condensate of the oxidized polymer, the amine and the formaldehyde yielding reagent cannot be characterized with precise chemical formulas. The oxidation of the polymer produces predominantly carbonyl groups, although a minor amount of aldehyde, acid and perhaps ester may also be present in the polymer chain. In view of the complex nature of the final oxidized reaction product, the precise composition, reaction sites, and final structure of such product cannot be defined by a conventional chemical structure, but rather must be defined purely through method of preparation and product properties. Chemical reactants which are added at different steps in the production beginning with the polymerization of the copolymer and ending with the Mannich condensation reaction, produce useful compounds when added to the reaction at different steps. The reaction sites of the various chemical additives vary with the step in which the various chemical reactants are added. Therefore, a reactant added during the polymerization will produce unique effects on a chemical and physical properties of the polymer. Reactants which are added during the oxidation of the polymer and during the Mannich condensation reaction will produce different, but unique effects. West, et al. U.S. Pat. No. 2,011,380, claims the use of a sulfonic acid salt to promote oxidation of the copolymer. During the oxidation of the copolymer, the sulfonic acid appears to be chemically altered.

The described reaction products of the present invention are effective dispersant and viscosity index improving additives in lubricant compositions when used in amounts from about 0.1 to 10 percent, based on neat copolymer.

Suitable lubricating base oils are mineral oils, petroleum oils, synthetic lubricating oils such as those obtained by the polymerization of hydrocarbons, and other well-known synthetic lubricating oils, and lubricating oils of animal or vegetable origin. Concentrates of a suitable oil base containing more than 10 wt. percent, or one or more additives, can be used for blending with the lubricant oils in proportions desried for particular conditions or used to give finished products containing from about 0.1 to about 20% of additives of this invention.

According to the present invention, a Mannich condensation product prepared as described above can be rendered less susceptible to viscosity increase during storage, shipping and handling, by physically blending, i.e., admixing the product with about 0.1 to about 20 wt. % and preferably about 0.5 to about 8.0 wt. % (based on copolymer) of a phenolic compound having the general formula:

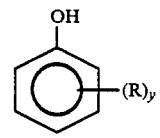

where R is alkyl; or hydroxy, chloro or bromo substituted hydrocarbyl; y is an integer from 1 to 5. In some cases the R group can be made by polymerizing $C_2$–$C_6$ olefins to a molecular weight in the range of about 80 to about 100,000, preferably about 80 to 1,000 and then attaching said group to a benzene ring by well known alkylation techniques. R can be a hydrocarbyl group such as methyl ethyl, propyl, isopropyl, butyl, isobutyl, t-butyl, amyl, isoamyl, t-amyl, isomers of hexyl, heptyl, nonyl, decyl, undecyl, dodecyl and other $C_{13}$–$C_{20}$ isomers and the like, having a molecular weight from about 15 to 1,000.

R can be any hydrocarbon or substituted hydrocarbon which results in an oil soluble phenol or salt thereof. R can be an intermediate molecular weight hydrocarbyl such as a $C_{15}$–$C_{100}$ of polybutene or polypropylene polymer, a high molecular weight hydrocarbyl such as polyolefin having a number average molecular weight about 15 to 100,000, preferably about 200 to 10,000 and others. R can be substituted with groups such as chlorine, bromine, hydroxy, or other groups.

The manner of admixing the phenol and the Mannich reaction product is not critical. Any conventional mixing or blending procedure which achieves thorough blending is suitable. Preferably, such blending can be carried out at a temperature of about 150° F. to about 300° F. At temperatures below 150° F. mixing becomes difficult due to the viscosity of the polymeric Mannich product. Temperatures greater than about 300° F. can break down the Mannich product. A preferred phenol for use in the present invention is dodecylphenol. Preferably, about 0.5 to about 8.0 wt. percent (based on copolymer) of the dodecylphenol is mixed with the Mannich product for about 1–3 hours at about 200° F. to facilitate mixing.

EXAMPLE I

Oxidation of the Copolymer

An oxidized copolymer ("Sample I") was obtained as follows: 500 grams of an ethylene propylene copolymer containing about 40 mole % propylene having a molecular weight of about 60,000 was dissolved in 4,500 grams of 100N process oil at 250° to 320° F. with stirring under nitrogen in a flask fitted with a stirrer and means to sparge a 50/50 mixture of air and nitrogen through the contents. After 10 grams of an overbased magnesium polypropylbenzene sulfonic acid color inhibitor, having a molecular weight of about 600, was added to the mixture and stirred overnight, 10 grams of polypropylbenzene sulfonic acid oxidation catalyst was added. The oxidative degradation was then begun by heating to 350°–400° F. and blowing nitrogen and air through the reaction media, each at 1,600 cc/min, and stirring at 325 rpm. After approximately 3–5 hours, the viscosity was reduced from approximately 16,000 cSt at 210° F. to about 320 cSt.

EXAMPLE II

Oxidation of the Copolymer

An oxidized copolymer (Sample II) was obtained in accordance with the procedures described in Example I above except the copolymer was oxidized to a final viscosity of 270 cSt.

EXAMPLE III

Mannich Reaction

Mannich condensation products from the oxidized polymers (Samples I and II) were prepared by adding slowly to the copolymer with stirring at 360° F., 19 grams of propylbenzene sulfonic acid catalyst, 15 grams of hexamethylene diamine, and 25 grams of a 37% aqueous solution of formaldehyde. After the addition of the reagents, the reaction was stirred one hour at 360° F. and then stripped with nitrogen for one hour. The final viscosity of the Mannich product from Sample I had a final viscosity of 450 centistokes and the product from Sample II had a final viscosity of 376 centistokes.

EXAMPLE IV

Addition of Alkylphenol

Samples I and II Mannich products obtained in Example III were individually physically blended with 0.25 wt. % dodecylphenol as follows: 1,000 grams of the Mannich sample was charged into a flask and heated under nitrogen sparge to 200° F. 2.5 grams of dodecylphenol were added when the heated Mannich sample reached 150° F. The mixture was stirred at 200° F. for 2 hours.

TABLE I

Effect of Adding Dodecylphenol to Mannich Dispersant/VI Improver in Terms of Reducing Increase in Viscosity During Storage
ASTM D-445 was used to measure the difference in kinematic viscosity change (measured at 100° C. after one week of storage at 200° F. in air) observed for Mannich Samples I and II without dodecylphenol and the same samples with 0.25 wt. % dodecylphenol.

| Dodecylphenol (wt. %) | Mannich Sample | Viscosity Change, cSt |
|---|---|---|
| 0.0 | II | +112 |
| 0.0 | I | +117 |
| 0.25 | II | +64 |
| 0.25 | I | +61 |

We claim:

1. An improved dispersant and VI-improving Mannich composition suitable as a lubricating oil additive and having reduced susceptibility to viscosity increase during storage, consisting essentially of the following admixed components: (a) a hydrocarbyl; and (b) a Mannich condensation product obtained by reacting under Mannich conditions an oxidized polymer, an amine, and a formaldehyde-yielding reagent, in a non-reactive solvent, wherein said Mannich reaction product includes the solvent.

2. The composition of claim 1 wherein the phenolic compound is admixed with the Mannich reaction product in an amount within the range of about 0.1 to about 20 wt. % based on the weight of the polymer.

3. An improved dispersant and VI-improving Mannich composition suitable for use as a lubricant additive having reduced susceptibility to viscosity increase during storage consisting essentially of: a physical blend prepared by admixing (a) a Mannich condensation product obtained from the Mannich reaction of an oxidized polymer, an amine and a formaldehyde reagent and (b) a phenolic compound having the formula represented by:

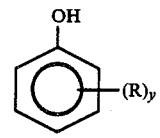

wherein R is any hydrocarbyl or hydroxy-, chloro-, or bromo-substituted hydrocarbyl group which results in an oil soluble phenol or salt thereof and y is an integer from 1–5, said R group having a molecular weight of about 15 to 100,000, and said improved composition being essentially free of other lubricant additive compositions.

4. The composition of claim 3 wherein R is selected from the group consisting of methyl, ethyl, propyl, isopropyl, butyl, isobutyl, t-butyl, amyl, isoamyl, t-amyl, isomers of hexyl, heptyl, nonyl, decyl, undecyl, dodecyl, and $C_{13}$–$C_{20}$ isomers.

5. The composition of claim 4 wherein R is dodecyl.

6. The composition of claim 3 wherein the phenolic compound and the Mannich reaction products are admixed at about 150° to about 300° F.

7. The composition of claim 6 wherein the phenolic compound is dodecylphenol.

8. The composition of claim 7 wherein the dodecylphenol is admixed with the Mannich product in an amount within the range of about 0.1 to about 20 wt. % based on the weight of the polymer.

9. A method for reducing the tendency of a dispersant and VI-improving Mannich condensation product to increase in viscosity during storage, which comprises: admixing a combination of ingredients consisting essentially of a phenolic compound and a dispersant VI-improving Mannich condensation product obtained from the Mannich reaction of an oxidized olefin polymer, an amine and a formaldehyde yielding reagent wherein the phenolic compound has a formula represented by:

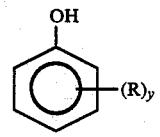

wherein R is any hydrocarbyl or hydroxy-, chloro-, or bromo-substituted hydrocarbyl group which results in an oil soluble phenol or salt thereof and y is an integer from 1–5, said R group having a molecular weight of about 15 to 100,000, and said admixed ingredients being essentially free of other lubricant additives.

10. The method of claim 9 wherein the phenolic compound is admixed with the Mannich condensation product in an amount within the range of about 0.1 to about 20 wt. % based on the weight of the polymer.

11. The method of claim 9 wherein R is selected from the group consisting of methyl, ethyl, propyl, isopropyl, butyl, isobutyl, t-butyl, amyl, isoamyl, t-amyl, isomers of hexyl, heptyl, nonyl, decyl, undecyl, dodecyl, and $C_{13}$–$C_{20}$ isomers.

12. The method of claim 11 wherein R is dodecyl.

13. The method of claim 11 wherein the phenolic compound and the Mannich reaction products are admixed at about 150° to about 300° F.

14. The method of claim 13 wherein the phenolic compound is dodecylphenol.

15. The method of claim 14 wherein the dodecylphenol is admxied with the Mannich product in an amount within the range of about 0.1 to about 20 wt. % based on the weight of the polymer.

16. A method for producing an improved Mannich dispersant and VI-improving lubricant additive composition having reduced susceptibility to viscosity increase during storage, which comprises (a) oxidizing an olefinic polymer dissolved in mineral oil diluent, (b) reacting the oxidized olefinic polymer-in-oil solution with an amine and a formaldehyde yielding reagent under Mannich reaction conditions and (c) preparing an admixture of components consisting essentially of (1) the Mannich reaction product in diluent oil obtained in step (b) and (2) a hydrocarbyl.

17. The method of claim 16 wherein the polymer is an amorphous copolymer comprising from about 30 to about 70 mole percent ethylene and from about 20 to about 70 mole percent propylene.

18. The method of claim 17 wherein the polymer is oxidized in the presence of from about 0.01 wt. % to about 5.0 wt. %, based on the polymer, of an oil soluble benzene sulfonic acid or salt thereof.

19. The method of claim 18 wherein the polymer has a molecular weight (Mn) of about 20,000 to about 200,000 and is oxidized in the temperature range of from about 100° to about 400° F.

20. The method of claim 19 wherein the oxidized polymer is reacted with formaldehyde and an alkylene polyamine.

21. The method of claim 16 wherein the phenolic compound is admixed with the Mannich condensation product in an amount within the range of about 0.1 to about 20 wt. % based on the weight of the polymer.

22. A method for producing an improved Mannich dispersant and VI-improving lubricant additive composition having reduced susceptibility to viscosity increase during storage, which comprises (a) oxidizing an olefinic polymer, (b) condensing the oxidized olefinic polymer with an amine and formaldehyde yielding reagent under Mannich reaction conditions and (c) admixing a combination of ingredients which consists essentially of the Mannich condensation product obtained in step (b) and a phenolic compound having the formula represented by:

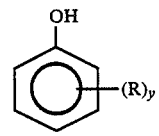

wherein R is any hydrocarbyl or hydroxy-, chloro-, or bromo-substituted hydrocarbyl group which results in an oil soluble phenol or salt thereof and y is an integer from 1–5, said R group having a molecular weight of about 15 to 100,000, said admixture being essentially free of other lubricant additives.

23. The method of claim 22 wherein R is selected from the group consisting of methyl, ethyl, propyl, isopropyl, butyl, isobutyl, t-butyl, amyl, isoamyl, t-amyl, isomers of hexyl, heptyl, nonyl, decyl, undecyl, dodecyl, and $C_{13}$–$C_{20}$ isomers.

24. The method of claim 23 wherein R is dodecyl.

25. The method of claim 22 wherein the phenolic compound and the Mannich reaction products are admixed at about 150° to about 300° F.

26. The method of claim 25 wherein the phenolic compound is dodecylphenol.

27. The method of claim 26 wherein the dodecylphenol is admixed with the Mannich product in an amount within the range of about 0.1 to about 0.20 wt. % based on the weight of the polymer.

* * * * *

UNITED STATES PATENT OFFICE
CERTIFICATE OF CORRECTION

Patent No. 4,808,325          Dated February 28, 1989

Inventor(s) Yoon S. Song and Robert J. Basalay

It is certified that error appears in the above-identified patent and that said Letters Patent is hereby corrected as shown below:

| Col. | Line | | |
|---|---|---|---|
| 9 | 65 | "hydrocarbyl" and should read | --hydrocarbyl substituted phenolic compound-- |
| 11 | 34 | "hydrocarbyl" and should read | --hydrocarbyl substituted phenolic compound-- |

Signed and Sealed this

Third Day of October, 1989

Attest:

DONALD J. QUIGG

Attesting Officer

Commissioner of Patents and Trademarks